(12) United States Patent
Katase et al.

(10) Patent No.: US 9,067,800 B2
(45) Date of Patent: *Jun. 30, 2015

(54) METHOD FOR MANUFACTURING TIN(II) OXIDE POWDER FOR REPLENISHING TIN COMPONENT OF TIN-ALLOY PLATING SOLUTION, AND TIN (II) OXIDE POWDER MANUFACTURED USING SAID METHOD

(75) Inventors: Takuma Katase, Sanda (JP); Akihiro Masuda, Sanda (JP); Kanji Kuba, Iwaki (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/115,360

(22) PCT Filed: May 8, 2012

(86) PCT No.: PCT/JP2012/061702
§ 371 (c)(1),
(2), (4) Date: Nov. 4, 2013

(87) PCT Pub. No.: WO2012/153715
PCT Pub. Date: Nov. 15, 2012

(65) Prior Publication Data
US 2014/0079618 A1    Mar. 20, 2014

(30) Foreign Application Priority Data
May 10, 2011   (JP) ................................. 2011-104952

(51) Int. Cl.
*C01G 19/00*    (2006.01)
*C01G 19/02*    (2006.01)
(Continued)

(52) U.S. Cl.
CPC .............. *C01G 19/02* (2013.01); *C01P 2004/61* (2013.01); *C01P 2006/11* (2013.01); *C01P 2006/12* (2013.01); *C01P 2006/80* (2013.01); *C25D 21/14* (2013.01); *C25D 3/30* (2013.01)

(58) Field of Classification Search
None
See application file for complete search history.

(56) References Cited

U.S. PATENT DOCUMENTS

| 8,501,293 B2 * | 8/2013 | Grandbois ................... 428/35.8 |
| 2003/0150743 A1 | 8/2003 | Obata et al. |
| 2011/0308960 A1 | 12/2011 | Orihashi |

FOREIGN PATENT DOCUMENTS

| CN | 101367543 A | 2/2009 |
| CN | 101665266 A | 3/2010 |

(Continued)

OTHER PUBLICATIONS

The Notification of the First Office Action dated Jun. 4, 2014, issued for the Chinese patent application No. 201280011903.9 and English translation thereof.
International Search Report dated Jul. 10, 2012, issued for PCT/JP2012/061702.

(Continued)

*Primary Examiner* — Steven Bos
(74) *Attorney, Agent, or Firm* — Locke Lord LLP; James E. Armstrong, IV

(57) ABSTRACT

An object of the present invention is to provide tin(II) oxide powder which has extremely high solubility in an acid or an acidic plating solution, excellent in storage stability in the air and can heighten oxidation-preventive effect of $Sn^{2+}$ ion in the plating solution. The method for manufacturing tin(II) oxide powder of the present invention comprises Step (11) of preparing an aqueous acidic solution containing $Sn^{2+}$ ions, Step (12) of neutralizing the aqueous acidic solution by adding an aqueous alkaline solution to prepare a slurry of tin(II) hydroxide, Step (13) of dehydrating the prepared slurry to obtain a slurry of tin(II) oxide, Step (14) of separating the slurry of tin(II) oxide into a solid and a liquid to obtain tin(II) oxide, Step (15) of treating the obtained tin(II) oxide with an aqueous antioxidant solution, and Step (16) of vacuum drying the tin(II) oxide treated with the aqueous antioxidant solution.

3 Claims, 1 Drawing Sheet

(51) Int. Cl.
*C25D 21/14* (2006.01)
*C25D 3/30* (2006.01)

(56) References Cited

FOREIGN PATENT DOCUMENTS

| | | |
|---|---|---|
| JP | 04-097911 A | 3/1992 |
| JP | 11-310415 A | 11/1999 |
| JP | 2003-096590 A | 4/2003 |
| JP | 2009-132570 A | 6/2009 |
| JP | 2009-132571 A | 6/2009 |
| KR | 10-2009-0066263 A | 6/2009 |
| TW | 201043737 A | 12/2010 |

OTHER PUBLICATIONS

Office Action dated Dec. 19, 2014, issued for the Korean patent application No. 2013-7022381 and English translation thereof.
Office Action dated Dec. 18, 2014, issued for the Chinese patent application No. 201280011903.9 and English translation thereof.
Hongfa Zhu et al., "Elements of the carbon group and the compounds thereof," A Handbook of Catalyst, JINDUN Publishing House, Aug. 2008, p. 128 and English translation thereof.
European Search Report mailed Sep. 25, 2014, issued for the European patent application No. 12781588.4.
Office Action dated Mar. 23, 2015, issued for the corresponding Taiwanese patent application No. 101114525 and English translation thereof.

\* cited by examiner

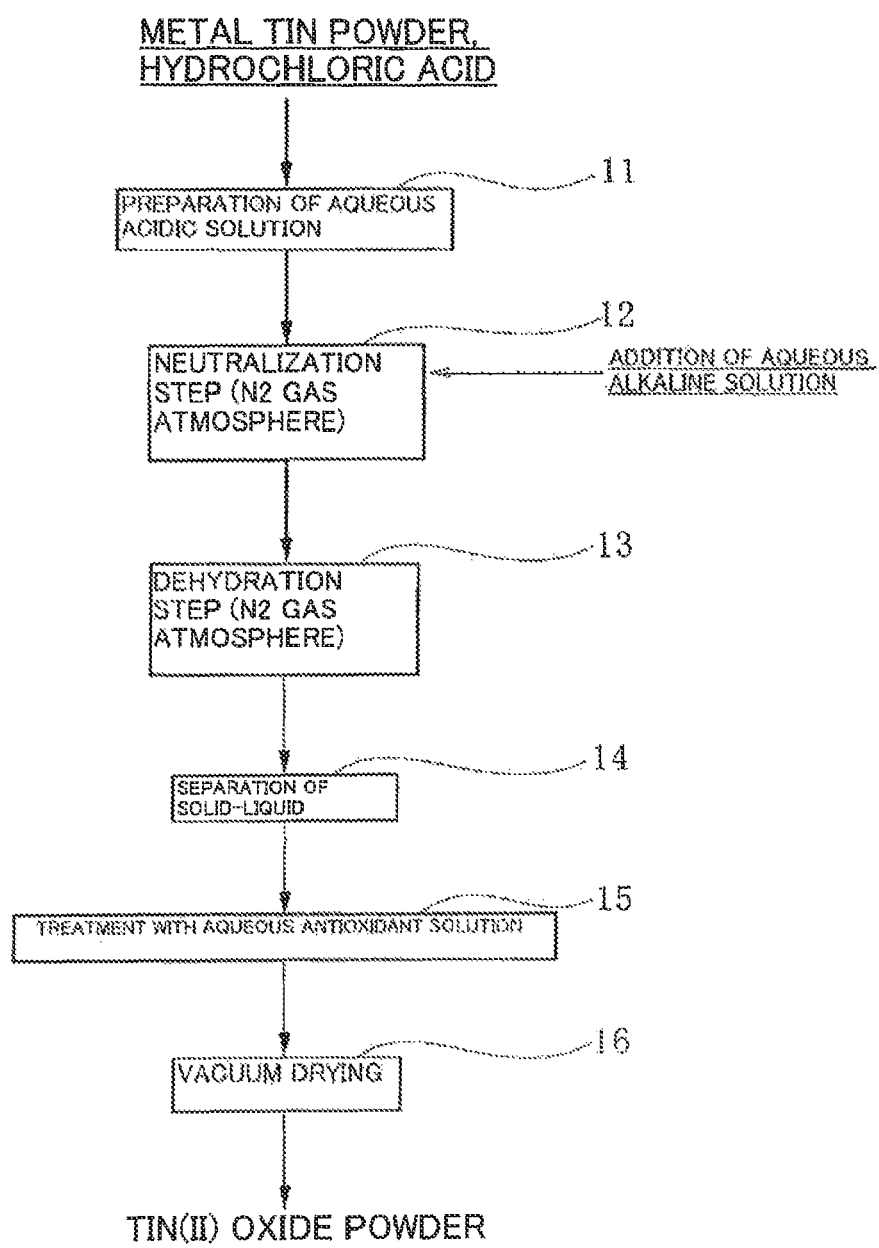

METHOD FOR MANUFACTURING TIN(II) OXIDE POWDER FOR REPLENISHING TIN COMPONENT OF TIN-ALLOY PLATING SOLUTION, AND TIN (II) OXIDE POWDER MANUFACTURED USING SAID METHOD

CROSS REFERENCE TO RELATED APPLICATIONS

This application is related to co-pending application: "TIN (II) OXIDE POWDER FOR REPLENISHING TIN COMPONENT OF TIN-ALLOY PLATING SOLUTION AND METHOD FOR MANUFACTURING SAID POWDER" filed even date herewith in the names of Takuma Katase, Akihiro Masuda and Kanji Kuba as a national phase entry of PCT/JP2012/061703, which application is assigned to the assignee of the present application and is incorporated by reference herein.

TECHNICAL FIELD

The present invention relates to tin(II) oxide (stannous oxide) powder suitable for replenishing a tin component to a tin-alloy plating solution. More specifically, it relates to a method for manufacturing tin(II) oxide powder excellent in solubility to an acid or an acidic plating solution and storage stability, and can heighten oxidation-preventive effect of $Sn^{2+}$ ion in the plating solution and the tin(II) oxide powder manufactured using the method.

BACKGROUND ART

A Pb—Sn alloy plating solution has been widely used until now for plating to electronic devices for which soldering was necessary or for the formation of a solder bump electrode (bump) to a semiconductor wafer, etc. However, the Pb—Sn alloy plating solution contains toxic Pb, so that there are many problems in a wastewater treatment, environmental conservation, or a soil and groundwater pollution from wastes of the semiconductors, etc. In recent years, for the purpose of reducing such a burden on the environment, researches have been carried out as a substitute for the Pb—Sn alloy plating solution containing lead, on a plating solution using a binary alloy which utilizes tin as a first element and uses silver, bismuth, copper, indium, antimony, zinc, etc., as a second element, or a multicomponent alloy to which a third element is further added, and among these, a Sn—Ag plating solution is now becoming a main stream as a Pb-free plating solution.

In an electroplating process using the Pb—Sn alloy plating solution, however, when an anode (an anode of the electroplating process) made of Pb—Sn is used, $Pb^{2+}$ and $Sn^{2+}$ ions are dissolved from the anode into the plating solution, so that the balance of the components of the Pb—Sn alloy plating solution is kept substantially constant. On the other hand, in the electroplating process using, for example, a Sn—Ag plating solution, when an anode made of Sn—Ag is used, Ag is gradually precipitated on the surface of the anode to coat the surface of the anode, so that $Sn^{2+}$ ion is not replenished from the anode to the plating solution. Thus, a balance of components of the plating solution is changed, whereby it causes a problem in the electroplating process using an anode made of Sn—Ag in the Sn—Ag plating solution. Therefore, in the electroplating process using a Sn—Ag plating solution, an insoluble platinum-plated titanium plate, etc., is used as an anode.

Also, when an insoluble anode is used, for replenishing components of the plating solution, a method in which a metal tin is supplied by dissolving in the plating solution can be considered. According to this method, however, in the case of an alloy plating with a metal which is nobler than tin, a noble metal is precipitated on the surface of the metal tin by substituting it in the plating solution so that there is a problem that dissolution of the metal tin is suppressed. Thus, replenishment has generally been carried out by adding a tin salt solution in which essential components of the plating solution had previously been dissolved (for example, see Patent Document 1.).

However, as described in the above-mentioned Patent Document 1, in the method in which $Sn^{2+}$ ion is replenished by injecting a tin salt solution, etc. (hereinafter referred to as an "element solution") where essential components of the plating solution are dissolved therein, it must prepare the element solution to be injected, and the element solution must be injected while analyzing the components of the plating solution whereby control of the plating solution is difficult and also a large cost is necessary.

To overcome the above-mentioned problems, it has been investigated a method in which tin(II) oxide powder having an extremely high solubility in an acid or an acidic plating solution is directly added to the plating solution whereby the tin component in the plating solution is replenished (for example, see Patent Document 2.).

PRIOR ART REFERENCES

Patent Documents

Patent Document 1: JP 2003-96590A (paragraph [0028])
Patent Document 2: JP 2009-132571A (Claim 1, paragraph

SUMMARY OF THE INVENTION

Problems to be Solved by the Invention

However, the tin(II) oxide powder to be used in the replenishing method shown in the above-mentioned Patent Document 2 has a small average particle diameter and a large specific surface area, so that the surface of the tin(II) oxide powder is likely oxidized from SnO to $SnO_2$ when it is exposed to the air. Solubility in an acid or an acidic plating solution of the tin(II) oxide powder whose powder surface has been oxidized to $SnO_2$ is markedly lowered, so that it is necessary to store the powder in a vacuum pack, etc., from immediately after manufacturing the powder to just before using the same, and after opening thereof, it is necessary to use the whole amount promptly. Therefore, a further improvement has been desired in the aspect of storage and control or handling thereof by applying a certain measure or treatment to the tin(II) oxide powder, etc.

On the other hand, extremely high solubility in an acid or an acidic plating solution is required to the tin(II) oxide powder to be used in the replenishing method in which the above-mentioned tin(II) oxide powder is directly added to the plating solution. This is because, if tin(II) oxide powder having a low solubility is used in this replenishing method, the tin(II) oxide powder is not sufficiently dissolved in the plating solution when it is added to the plating solution, and precipitates are gradually generated in the plating solution as a sludge containing insoluble tin(IV) oxide (stannic oxide) whereby replenishment of the $Sn^{2+}$ ion becomes difficult. Therefore, when a certain measure for preventing oxidation is to be applied to the tin(II) oxide powder to be used in this replenishing method, it must be carried out without impairing high solubility of the powder in an acid or an acidic plating solution, whereby it is extremely difficult to coexist the two characteristics.

The sludge containing the above-mentioned insoluble tin (IV) oxide is also generated by the $Sn^{2+}$ ion which has been once dissolved in the plating solution and replenished in the same being oxidized by a dissolved oxygen in the plating solution. If the sludge is generated, replenishment of the $Sn^{2+}$ ion becomes difficult, and it causes inconvenience that a piping or a filter of a plating treatment device is clogged, or the sludge is attached to the plated surface to lower the quality of the plated surface.

An object of the present invention is to provide a method for manufacturing tin(II) oxide powder having extremely high solubility in an acid or an acidic plating solution, excellent in storage stability in the air, and yet, capable of heightening oxidation-preventive effect of $Sn^{2+}$ ion in the plating solution and the tin(II) oxide powder manufactured by the method.

Means for Solving the Problems

A first aspect of the present invention is, as shown in FIG. 1, a method for manufacturing tin(II) oxide powder for replenishing a tin component to a tin-alloy plating solution comprising Step 11 of preparing an aqueous acidic solution containing $Sn^{2+}$ ions, Step 12 of neutralizing the aqueous acidic solution by adding an aqueous alkaline solution to obtain a slurry of tin(II) hydroxide, Step 13 of dehydrating the prepared slurry to obtain a slurry of tin(II) oxide, Step 14 of separating the slurry of tin(II) oxide into a solid and a liquid to obtain tin(II) oxide, Step 15 of treating the obtained tin(II) oxide with an aqueous antioxidant solution, and Step 16 of vacuum drying the tin(II) oxide treated with the aqueous antioxidant solution.

A second aspect of the present invention is an invention based on the first aspect, and further the treatment with the aqueous antioxidant solution is carried out by a method of spraying the aqueous antioxidant solution to the tin(II) oxide powder or dipping the tin(II) oxide powder in the aqueous antioxidant solution.

A third aspect of the present invention is an invention based on the first or the second aspect, and further the above-mentioned antioxidant is at least one selected from the group consisting of hydroquinone, catechol, resorcinol, pyrogallol, gallic acid, glucose, galactose, fructose, ribose, xylose, maltose, lactose, hydrazine sulfate, carbohydrazide and sodium cyanotrihydroborate.

A fourth aspect of the present invention is tin(II) oxide powder for replenishing a tin component to a tin-alloy plating solution manufactured by the manufacturing method based on the first aspect, wherein the antioxidant is contained in the powder in a mass ratio of 100 to 5000 ppm, and the powder has such a dissolution rate that when 0.1 g of the tin(II) oxide powder is added to 100 ml of 100 g/L aqueous alkylsulfonic acid solution at a temperature of 25° C. and stirred, then, it completely dissolves therein within 180 seconds.

A fifth aspect of the present invention is an invention based on the fourth aspect, wherein the tin(II) oxide powder is coated by the antioxidant, has an average particle diameter with a $D_{50}$ value of within 5 to 15 μm, and has a tap density of 0.6 to 1.2 $g/cm^3$.

Effects of the Invention

In the manufacturing method of the first aspect of the present invention, it comprises a step of preparing an aqueous acidic solution by dissolving metal tin powder in an acid, a step of neutralizing the aqueous acidic solution by adding an aqueous alkaline solution to obtain a slurry of tin(II) hydroxide, a step of dehydrating the prepared slurry by heating and keeping the state to obtain a slurry of tin(II) oxide, a step of separating the slurry of the tin(II) oxide into a solid and a liquid to obtain tin(II) oxide, a step of treating the obtained tin(II) oxide with an aqueous antioxidant solution, and a step of vacuum drying the tin(II) oxide treated by the aqueous antioxidant solution. According to this procedure, tin(II) oxide powder having high solubility in an acid or an acidic plating solution, excellent in storage stability in the air, and yet can heighten oxidation-preventive effect of $Sn^{2+}$ ions in the plating solution can be manufactured.

In the manufacturing method of the third aspect of the present invention, at least one selected from the group consisting of hydroquinone, catechol, resorcinol, pyrogallol, gallic acid, glucose, galactose, fructose, ribose, xylose, maltose, lactose, hydrazine sulfate, carbohydrazide and sodium cyanotrihydroborate is used as the antioxidant. The above-mentioned antioxidant has extremely high solubility in an acid or an acidic plating solution, so that, by using the above-mentioned antioxidant, oxidation-preventive property can be provided to the powder without causing any effects on the solubility of the powder in an acid or an acidic plating solution. By using the above-mentioned antioxidant, it is possible to prevent from generating sludge by the tin(II) oxide powder being oxidized during dissolution, or from precipitation by substitution of a metal component which is nobler than the tin in the plating solution, whereby the $Sn^{2+}$ ion can be stably replenished to the plating solution.

The tin(II) oxide powder of the fourth aspect of the present invention is tin(II) oxide powder for replenishing a tin component to a tin-alloy plating solution manufactured by the manufacturing method based on the first aspect, and the antioxidant is contained in the powder with a mass ratio of 100 to 5000 ppm. According to this constitution, the powder shows extremely high solubility in an acid or an acidic plating solution, and excellent storage stability in the air. Specifically, it has such a dissolution rate that when 0.1 g of the tin(II) oxide powder is added to 100 ml of 100 g/L aqueous alkylsulfonic acid solution at a temperature of 25° C. and is stirred, then, it completely dissolves within 180 seconds. In addition, it can heighten oxidation-preventive effect of the $Sn^{2+}$ ions in the plating solution.

BRIEF DESCRIPTION OF THE DRAWING

FIG. 1 is a flow chart showing a method for manufacturing tin(II) oxide powder for replenishing a tin component to a tin-alloy plating solution of the embodiment of the present invention.

EMBODIMENTS TO CARRY OUT THE INVENTION

Next, an embodiment to carry out the present invention is explained by referring to the drawings.

In the manufacturing method of the tin(II) oxide powder of the present invention, as shown in FIG. 1, an aqueous acidic solution containing $Sn^{2+}$ ions is firstly prepared (Step 11). The preparation method of the above-mentioned aqueous acidic solution is not particularly limited, and, for example, there may be mentioned a method in which the metal tin powder is dissolved in hydrochloric acid. At this time, preferred concentration of the hydrochloric acid is 30 to 40% by mass and a temperature thereof is 80 to 100° C., and the metal tin powder is dissolved therein over 18 to 30 hours. The metal tin powder to be used preferably has an α-ray emitting amount of 0.05 cph/cm$^2$ or less. This is because, if the α-ray emitting amount exceeds 0.05 cph/cm$^2$, there are inconveniences that, for example, in a semiconductor, etc., there occurs a soft error, etc. in which the data in the memory are rewritten or the semiconductor may be destroyed because of the α-ray emitted from the solder bump electrode.

Next, an aqueous alkaline solution is added to the aqueous acidic solution prepared as mentioned above to neutralize the same to prepare a slurry of tin(II) hydroxide (Step 12). The above-mentioned aqueous alkaline solution may be exemplified by an aqueous ammonia, an ammonium bicarbonate solution or a mixed solution thereof. Here, the neutralization step for preparing a slurry of the tin(II) hydroxide is preferably carried out in a nitrogen gas atmosphere. When the neutralization step is carried out in the nitrogen gas atmosphere, an effect can be obtained that the $Sn^{2+}$ ion in the aqueous acidic solution is prevented from being oxidized to tin(IV) oxide which is slightly soluble in an acid, as compared with the case where the step is carried out in the air. This is because, when the neutralization step is carried out in the nitrogen gas atmosphere in which no oxygen is present, dissolution of the oxygen into the slurry can be prevented.

When aqueous ammonia is to be added as an aqueous alkaline solution, a concentration of the aqueous ammonia to be used is preferably 28 to 30% by mass. If the concentration of the aqueous ammonia is less than the lower limit value, the neutralization reaction does not proceed sufficiently so that it is not preferred. On the other hand, if it exceeds the upper limit value, dehydration reaction of the tin(II) hydroxide proceeds rapidly, and a concentration of an anion component in the acid remained in the tin(II) oxide becomes high so that it is not preferred. The reason why aqueous ammonia is used as the aqueous alkaline solution is that it is suitable to control the particle diameter of the tin(II) oxide powder to be manufactured. As the aqueous alkaline solution, ammonium bicarbonate may be used alone, or an ammonium bicarbonate aqueous solution may be used by mixing with aqueous ammonia simultaneously. The neutralization reaction is carried out at a liquid temperature of the reaction mixture of 30 to 50° C., and preferably carried out at a pH range of 6 to 8. If the liquid temperature of the reaction solution is less than the lower limit value, a concentration of an anion component in the acid remained in the tin(II) oxide becomes high so that it is not preferred, while if it exceeds the upper limit value, the dehydration reaction of the tin(II) hydroxide proceeds with the progress of the neutralization reaction so that it is not preferred. The reason why the pH of the reaction solution is set to the above-mentioned range is that it is a suitable range in the points of progress of the neutralization reaction and readily-solubility of the manufactured powder. If the pH is less than the lower limit value, the neutralization reaction does not proceed sufficiently so that it is not preferred. While if it exceeds the upper limit value, a hardly soluble tin salt such as ammonium stannate and metal tin are formed whereby a yield is lowered or a much amount of components which are slightly soluble in the plating solution is contained so that it is not preferred.

Next, the slurry prepared as mentioned above is heated and kept to mature and dehydrate the tin(II) hydroxide, whereby a slurry of tin(II) oxide is obtained (Step 13). The dehydration step of obtaining a slurry of tin(II) oxide by dehydrating tin(II) hydroxide with heating and keeping the state is preferably carried out in a nitrogen gas atmosphere. By carrying out the dehydration step in the nitrogen gas atmosphere, an effect can be obtained that the tin(II) oxide in the slurry is prevented from being oxidized to tin(IV) oxide which is slightly soluble in an acid, as compared with the case where the step is carried out in the air as in the conventional procedure. This is because, when the dehydration step is carried out in the nitrogen gas atmosphere in which no oxygen is present in the atmosphere, dissolution of the oxygen into the slurry can be prevented. A temperature of heating and keeping the state is preferably 80 to 100° C. If the temperature of heating and keeping the state is less than the lower limit value, dehydration of the tin(II) hydroxide does not proceed sufficiently, and white-colored tin(II) hydroxide is remained in the reaction system so that it is not preferred. On the other hand, it is physically impossible to heat the reaction solution at a temperature higher than the boiling point of water under atmospheric pressure conditions. A time of heating and keeping the state may vary depending on an amount of the slurry or a temperature of heating and keeping the state, and is preferably 1 to 2 hours.

Then, the above-mentioned slurry of the tin(II) oxide is separated into a solid and a liquid by filtration, centrifugation, etc., to obtain the solid component of tin(II) oxide (Step 14). Further, the obtained tin(II) oxide is preferably treated with an aqueous antioxidant solution having a concentration of 0.1 to 5% by mass (Step 15). The antioxidant is preferably at least one selected from the group consisting of hydroquinone, catechol, resorcinol, pyrogallol, gallic acid, glucose, galactose, fructose, ribose, xylose, maltose, lactose, hydrazine sulfate, carbohydrazide and sodium cyanotrihydroborate. The above-mentioned antioxidant has an extremely high solubility in an acid or an acidic plating solution, so that by using the above-mentioned antioxidant, oxidation-preventive effect can be provided to the powder without causing any effects on the solubility of the powder in an acid or an acidic plating solution. Preparation of the aqueous antioxidant solution is carried out by adding the antioxidant to a solvent so that the solution has a desired concentration, and stirring the mixture. The solvent may be water or ethanol, etc. The reason why the concentration of the aqueous antioxidant solution is set within the above-mentioned range is to adjust the content of the antioxidant contained in the tin(II) oxide powder after manufacture. If the concentration of the aqueous antioxidant solution is out of the above-mentioned range, it is difficult to adjust the content of the antioxidant contained in the powder to a desired value.

With regard to the treatment method of the tin(II) oxide by the aqueous antioxidant solution prepared as mentioned above is not particularly limited, and there may be mentioned a method in which the tin(II) oxide is dipped in the aqueous antioxidant solution, a method in which the aqueous antioxidant solution is sprayed to the tin(II) oxide, or a method in which washing of the tin(II) oxide powder after the above-mentioned separation of the solid and the liquid (Step 14) is carried out by using the above-mentioned aqueous antioxidant solution. Among these, a method in which the tin(II) oxide is dipped in the aqueous antioxidant solution at 20 to 30° C. for 5 to 10 minutes is particularly preferred since the content of the antioxidant contained in the tin(II) oxide powder after manufacturing can be easily controlled.

The tin(II) oxide treated by the aqueous antioxidant solution is vacuum dried (Step 16). The reasons why the drying is carried out by vacuum drying are to prevent from oxidation of the tin(II) oxide powder during the drying, to prevent from aggregation of the powder particles.

According to the manufacturing method of the present invention as mentioned above, tin(II) oxide powder suitable for a method of directly adding tin(II) oxide powder to a plating solution can be manufactured as a method for replenishing a tin component to a tin-alloy plating solution.

The tin(II) oxide powder of the present invention obtained by the above-mentioned method contains the above-mentioned antioxidant in the powder with a mass ratio of 100 to 5000 ppm. Thus, even when the powder is stored in the state that it is exposed to the air, the surface of the tin(II) oxide powder is hardly oxidized from SnO to $SnO_2$, so that the powder after storage for a long period of time can maintain high solubility in an acid or an acidic plating solution. The above-mentioned antioxidant also acts to prevent the $Sn^{2+}$ ion in the plating solution from being oxidized. Therefore, when the tin(II) oxide powder is added to the plating solution, oxidation of the $Sn^{2+}$ ion replenished by addition can be prevented, and generation of the sludge in the plating solution can be suppressed. Therefore, by the addition of the tin(II) oxide powder, replenishment of $Sn^{2+}$ ion of the plating solution can be carried out sufficiently. Also, inconveniences of causing clogging of a piping or a filter of the plating treatment device caused by generation of the sludge, or lowering quality of the plating surface due to attachment of sludge onto the plating surface can be cancelled. If the content of the antioxidant contained in the powder is less than 100 ppm with a mass ratio, oxidation of the powder surface cannot be sufficiently prevented when the powder is stored in the air. In addition, an oxidation-preventive effect of the $Sn^{2+}$ ion replenished by adding to the plating solution cannot be sufficiently obtained. On the other hand, if the content exceeds 5000 ppm, in addition to saturation of the oxidation-preventive effect, plating property is lowered by adding an excessive amount of the antioxidant into the plating solution. Among these, the content of the antioxidant contained in the powder is preferably in the range of 1000 to 3000 ppm with a mass ratio.

The tin(II) oxide powder has an average particle diameter of 5 to 15 μm with $D_{50}$ value, a specific surface area of 0.4 to 3.5 $m^2/g$, and a tap density of 0.6 to 1.2 $g/cm^3$. The tin(II) oxide powder having an average particle diameter and a tap density within the above-mentioned ranges has extremely high solubility in an acid or an acidic plating solution, or is readily soluble in an acid or an acidic plating solution. As an index showing the solubility, a dissolution rate in an acid may be mentioned. Specifically, there may be attained a dissolution rate such that when 0.1 g of tin(II) oxide powder is added to 100 ml of 100 g/L aqueous alkylsulfonic acid solution at a temperature of 25° C. and stirred, then, it completely dissolves within 180 seconds. The tin(II) oxide powder subjected to the above-mentioned oxidation-preventive treatment can be prevented from oxidation of the dissolved $Sn^{2+}$ ion. Thus, even when the tin(II) oxide powder is directly added to the plating solution without subjecting to adjustment of the element solution, it is dissolved in the plating solution immediately without generating a sludge, and a $Sn^{2+}$ ion component of the plating solution can be replenished.

The tin(II) oxide powder manufactured by the manufacturing method of the present invention is particularly excellent in solubility in an alkylsulfonic acid such as methanesulfonic acid, ethanesulfonic acid and 1-propanesulfonic acid each of which is a component of the acidic plating solution as an acid, and in an alloy plating solution comprising Sn and a metal which is nobler than Sn as an acidic plating solution such as Sn—Ag alloy plating solution, Sn—Cu alloy plating solution, Sn—Ag—Cu alloy plating solution and Au—Sn alloy plating solution.

EXAMPLES

Next, Examples of the present invention are explained in detail with Comparative Examples.

Example 1

First, 500 g of metal tin powder having an α-ray emitting amount of 0.0007 $cph/cm^2$ which is 0.05 $cph/cm^2$ or less was dissolved in 1000 g of hydrochloric acid with a concentration of 35% by mass and a temperature of 80° C. over 24 hours to prepare an aqueous acidic solution. Subsequently, in a tank filled with a nitrogen gas, an aqueous ammonia with a concentration of 30% by mass was added as an aqueous alkaline solution to the aqueous acidic solution while keeping the liquid temperature to 30° C. and a pH to 6, and the mixture was neutralized to obtain a slurry of tin(II) hydroxide.

Then, the slurry of the tin(II) hydroxide was heated under nitrogen gas atmosphere and kept to 90 to 100° C. to dehydrate the tin(II) hydroxide whereby a slurry of tin(II) oxide precipitates was obtained.

Next, the slurry of the tin(II) oxide precipitates was separated into a solid and a liquid by filtration to obtain the tin(II) oxide precipitates. The obtained tin(II) oxide precipitates were subjected to a dipping treatment by using a previously prepared aqueous antioxidant solution for 10 minutes. The aqueous antioxidant solution was prepared by using 0.6 g of hydrazine sulfate as an antioxidant and adding it in 599.4 g of water to be dissolved to prepare an aqueous hydrazine sulfate-containing solution with a concentration of 0.1% by mass.

The tin(II) oxide precipitates treated by the aqueous antioxidant solution were vacuum dried at a temperature of 25° C. to obtain 530 g of black-colored tin(II) oxide powder.

Example 2

In the same manner as in Example 1 except that gallic acid was prepared as an antioxidant, and the tin(II) oxide precipitates were treated by an aqueous gallic acid-containing solution with a concentration of 0.1% by mass, 535 g of black-colored tin(II) oxide powder was obtained.

Example 3

In the same manner as in Example 1 except that fructose was prepared as an antioxidant, and the tin(II) oxide precipitates were treated by an aqueous fructose-containing solution with a concentration of 0.1% by mass, 530 g of black-colored tin(II) oxide powder was obtained.

Example 4

In the same manner as in Example 1 except that catechol was prepared as an antioxidant, and the tin(II) oxide precipitates were treated by an aqueous catechol-containing solution with a concentration of 0.1% by mass, 532 g of black-colored tin(II) oxide powder was obtained.

Example 5

In the same manner as in Example 1 except that catechol was prepared as an antioxidant, and the tin(II) oxide precipitates were treated by an aqueous catechol-containing solution with a concentration of 2.5% by mass, 533 g of black-colored tin(II) oxide powder was obtained.

Example 6

In the same manner as in Example 1 except that the tin(II) oxide precipitates were treated by an aqueous hydrazine sulfate-containing solution with a concentration of 5% by mass, 528 g of black-colored tin(II) oxide powder was obtained.

Example 7

In the same manner as in Example 1 except that the tin(II) oxide precipitates were treated by an aqueous gallic acid-containing solution with a concentration of 5% by mass, 534 g of black-colored tin(II) oxide powder was obtained.

Example 8

In the same manner as in Example 1 except that the tin(II) oxide precipitates were treated by an aqueous fructose-containing solution with a concentration of 5% by mass, 530 g of black-colored tin(II) oxide powder was obtained.

Example 9

In the same manner as in Example 1 except that the tin(II) oxide precipitates were treated by an aqueous catechol-containing solution with a concentration of 5% by mass, 531 g of black-colored tin(II) oxide powder was obtained.

Comparative Example 1

In the same manner as in Example 1 except that no treatment by an aqueous antioxidant solution was carried out, 536 g of the black-colored tin(II) oxide powder was obtained.

Comparative Example 2

In the same manner as in Example 1 except that the tin(II) oxide precipitates were treated by an aqueous catechol-containing solution with a concentration of 0.08% by mass, 533 g of black-colored tin(II) oxide powder was obtained.

Comparative Example 3

In the same manner as in Example 1 except that the tin(II) oxide precipitates were treated by an aqueous catechol-containing solution with a concentration of 5.1% by mass, 528 g of black-colored tin(II) oxide powder was obtained.

Evaluation 1

With regard to the tin(II) oxide powders obtained in Examples 1 to 9 and Comparative Examples 1 to 3, a content of the antioxidant contained in the powder, an average particle diameter ($D_{50}$), a specific surface area and a tap density of the powders were measured. These results are shown in the following Table 1.

(1) Content of the antioxidant: First, the powders after the antioxidant treatment obtained in Examples 1 to 9 and Comparative Examples 1 to 3 were each dissolved in an aqueous alkylsulfonic acid solution to obtain respective solutions. Next, by using a high-speed liquid chromatography device (manufactured by Shimadzu Corporation, Name of Type: LC-20AD), it was measured by comparing an intensity ratio of a detection peak of the antioxidant concentration detected by the above-mentioned respective solutions, and a detection peak of an aqueous alkylsulfonic acid solution of the known antioxidant concentration.

(2) Average particle diameter ($D_{50}$) of powder: it shows a volume cumulative median diameter measured by using a particle size distribution measuring apparatus (manufactured by NIKKISO CO., LTD., Name of Type: MICROTRAC MT3000 particle size analyzer).

(3) Specific surface area of powder: it shows a BET specific surface area by the BET single-point method measured by using a surface area measuring apparatus (manufactured by Mountech CO. Ltd., Name of Type: automatic specific surface area (BET) measuring apparatus HM-model-1201).

(4) Tap density of powder: it was measured by Metal powder-Tap density measuring method regulated by JIS Z2512: 2006.

TABLE 1

|  | Aqueous antioxidant solution | | Tin(II) oxide powder | | | |
| --- | --- | --- | --- | --- | --- | --- |
|  | Kind | Content [% by mass] | Content of Antioxidant [ppm (mass ratio)] | Average particle diameter D50 [μm] | Specific surface area [m2/g] | Tap density [g/cm3] |
| Example 1 | Hydrazine sulfate | 0.1 | 103 | 8.1 | 0.5 | 0.9 |
| Example 2 | Gallic acid | 0.1 | 104 | 7.9 | 0.5 | 0.9 |
| Example 3 | Fructose | 0.1 | 104 | 8.3 | 0.5 | 0.9 |
| Example 4 | Catechol | 0.1 | 103 | 8.5 | 0.5 | 0.9 |
| Example 5 | Catechol | 2.5 | 2502 | 8.1 | 0.5 | 0.9 |
| Example 6 | Hydrazine sulfate | 5.0 | 4919 | 8.6 | 0.5 | 0.8 |
| Example 7 | Gallic acid | 5.0 | 4984 | 7.5 | 0.6 | 0.8 |
| Example 8 | Fructose | 5.0 | 4856 | 6.9 | 0.6 | 0.8 |
| Example 9 | Catechol | 5.0 | 4799 | 7.2 | 0.6 | 0.8 |
| Comparative Example 1 | — | — | — | 8.3 | 0.5 | 0.9 |
| Comparative Example 2 | Catechol | 0.08 | 79 | 8.4 | 0.5 | 0.9 |
| Comparative Example 3 | Catechol | 5.1 | 5231 | 8.5 | 0.5 | 0.8 |

Comparative test and Evaluation 2

With regard to tin (II) oxide powders of Examples 1 to 9 and Comparative Examples 1 to 3, each dissolution rate to an acid was measured. Specifically, with regard to the tin(II) oxide powders of Examples 1 to 9 and Comparative Examples 1 to 3, two kinds of powders were each prepared one of which was manufactured on the day, and the other of which was stored at a temperature of 40° C. for 3 days in the air after the manufacture. The dissolution rates of these powders were measured according to the following mentioned procedure.

First, each 0.1 g of the tin(II) oxide powder prepared as mentioned above was added to 100 ml of 100 g/L an aqueous alkylsulfonic acid solution at a temperature of 25° C. while stirring the mixture by using a stirrer with a rotation rate of 500 rpm, and a time from addition of the powder to confirmation of disappearance of the powder by visual observation was measured. These results are shown in the following Table 2.

TABLE 2

| | Dissolution time [sec] | |
|---|---|---|
| | Manufactured day | After 3 days of 40° C. Treatment |
| Example 1 | 27 | 43 |
| Example 2 | 27 | 43 |
| Example 3 | 28 | 33 |
| Example 4 | 29 | 41 |
| Example 5 | 29 | 42 |
| Example 6 | 22 | 25 |
| Example 7 | 26 | 42 |
| Example 8 | 27 | 31 |
| Example 9 | 30 | 56 |
| Comparative Example 1 | 28 | Not completely dissolved |
| Comparative Example 2 | 29 | 184 |
| Comparative Example 3 | 30 | 57 |

As can be clearly seen from Table 1 and Table 2, the tin(II) oxide powders measured on the manufacture day had rapid dissolution rates in either of the powders of Examples 1 to 2 and Comparative Examples 1 to 3, and it could be confirmed to be each excellent in solubility. On the other hand, with regard to the tin(II) oxide powders after storage in the air for 3 days under 40° C. condition, the powders of Comparative Examples 1 to 3 were markedly oxidized on the surface of the powder and lowered in the dissolution rates, so that it gave the result that the solubilities thereof were remarkably impaired. In particular, in Comparative Example 1, the powder was not completely dissolved. To the contrary, in the powders of Examples 1 to 2, it can be understood that oxidation on the surface of the powder could be suppressed even when they were stored in the air, no remarkable change in the dissolution rate was observed and high solubility could be maintained.

INDUSTRIAL APPLICABILITY

The manufacturing method of the present invention can be utilized for obtaining tin(II) oxide powder for replenishing a tin component to a tin-alloy plating solution.

The invention claimed is:

1. A method for manufacturing tin(II) oxide powder for replenishing a tin component of a tin-alloy plating solution comprising steps of:
   preparing an aqueous acidic solution containing $Sn^{2+}$ ions;
   neutralizing the aqueous acidic solution at a liquid temperature of 30 to 50° C. and at a pH range of 6 to 8 in a nitrogen gas atmosphere by adding an aqueous alkaline solution to prepare a slurry of tin(II) hydroxide;
   dehydrating the prepared slurry in a nitrogen gas atmosphere to prepare a slurry of tin(II) oxide;
   separating the slurry of tin(II) oxide into a solid and a liquid to obtain tin(II) oxide;
   treating the obtained tin(II) oxide with an aqueous antioxidant solution having a concentration of 0.1 to 5% by mass; and
   vacuum drying the tin(II) oxide treated with the aqueous antioxidant solution; wherein
      the aqueous alkaline solution is an aqueous ammonia solution an ammonium bicarbonate solution or mixture thereof; and
      the antioxidant is at least one selected from the group consisting of hydroquinone, catechol, resorcinol, pyrogallol, gallic acid, glucose, galactose, fructose, ribose, xylose, maltose, lactose, hydrazine sulfate, carbohydrazide and sodium cyanotrihydroborate.

2. The method for manufacturing tin(II) oxide powder for replenishing a tin component of a tin-alloy plating solution according to claim 1, wherein the treatment with the aqueous antioxidant solution is carried out by spraying the aqueous antioxidant solution to the tin(II) oxide powder or dipping the tin(II) oxide powder in the aqueous antioxidant solution.

3. Tin(II) oxide powder for replenishing a tin component of a tin-alloy plating solution manufactured by the method according to claim 1, wherein the tin(II) oxide powder is coated by the antioxidant, has an average particle diameter with a $D_{50}$ value of within 5 to 15 μm, and has a tap density of 0.6 to 1.2 $g/cm^3$, the antioxidant is contained in the powder at 100 to 5000 ppm, and the powder has such a dissolution rate that when 0.1 g of the tin(II) oxide powder is added to 100 ml of 100 g/L aqueous alkylsulfonic acid solution at a temperature of 25° C. and stirred, then, it completely dissolves therein within 180 seconds.

* * * * *